United States Patent Office 2,948,489
Patented Aug. 9, 1960

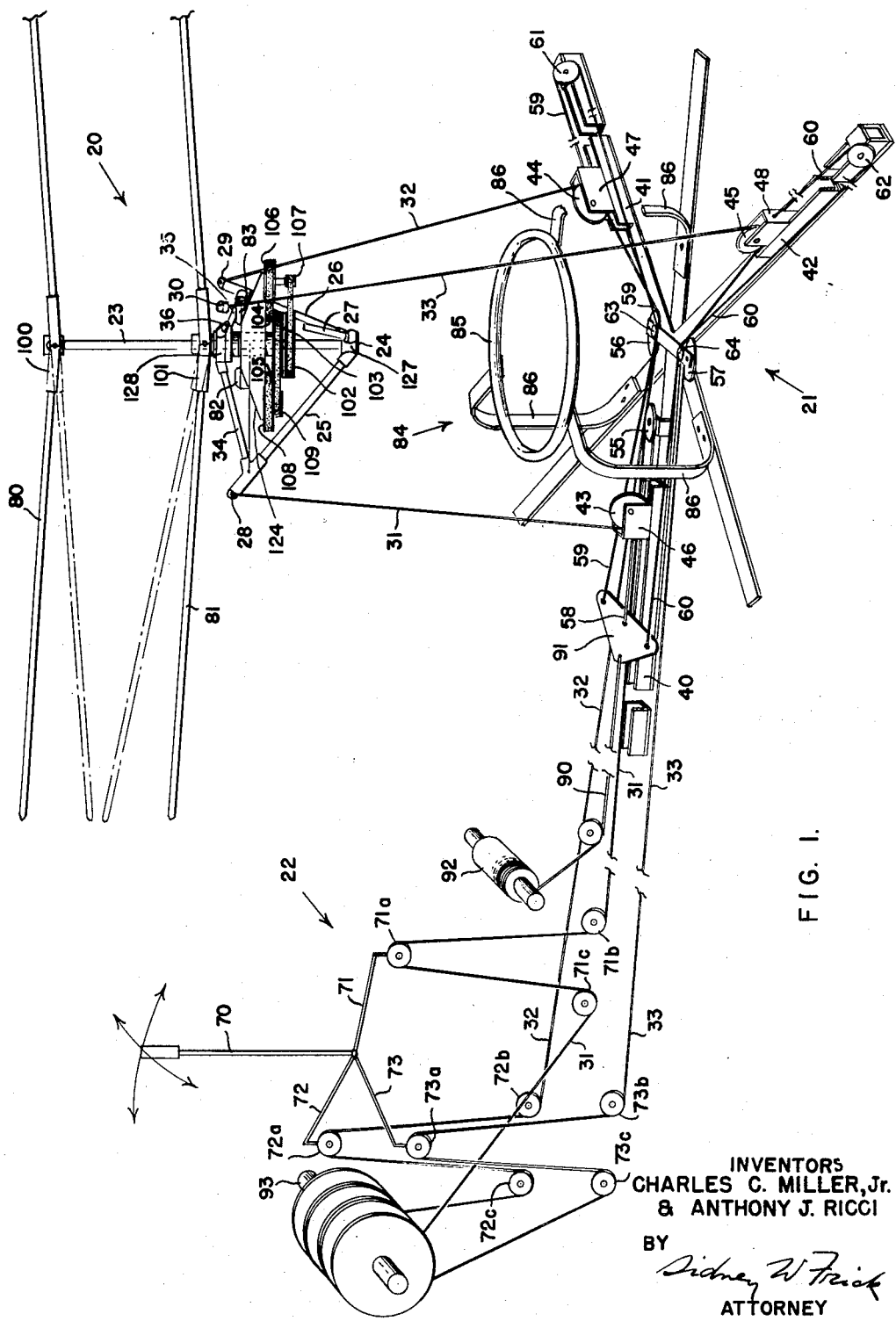

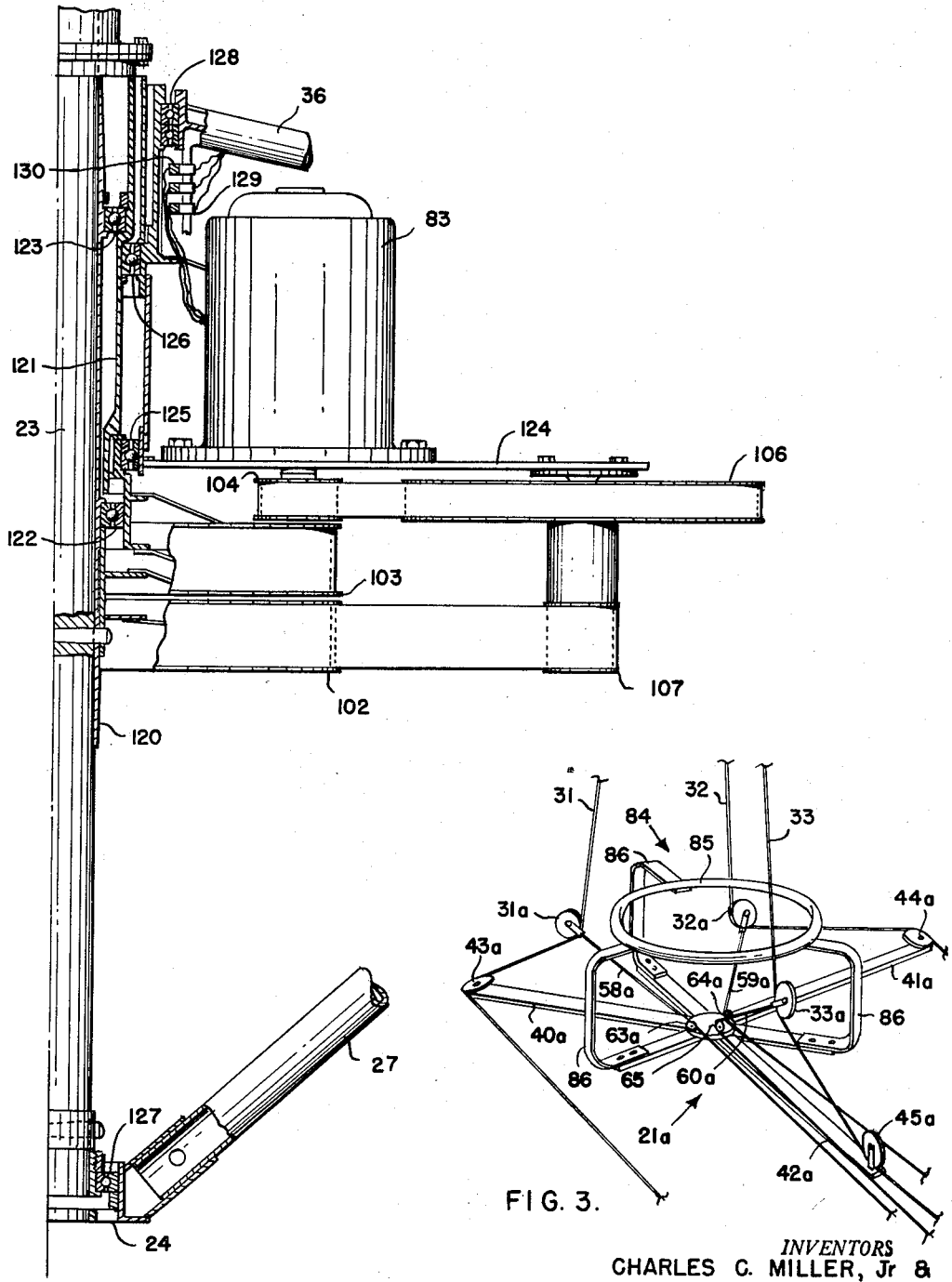

2,948,489

CAPTIVE ROTARY WING AIRCRAFT AND CONTROL SYSTEM

Charles C. Miller, Jr., Springfield, and Anthony J. Ricci, Drexel Hill, Pa., assignors to Altoscan Company, Lansdowne, Pa., a corporation of Pennsylvania Filed Apr. 10, 1956, Ser. No. 577,418

10 Claims. (Cl. 244—17.17)

This invention relates to rotary wing aircraft and similar devices, and more particularly to aircraft or devices of such type which are suitable for tethered or captive flight, and to systems and apparatus for maintaining such aircraft or devices captive and for the remote operation and control thereof.

There is a definite need for a simplified non-man-carrying aircraft having a useful load carrying characteristic, being susceptible of remote control, and having requisite stability in operation, and it is a primary objective of this invention to satisfy such need through the provision of a captive helicopter having the desired characteristics. Amongst the many military, commercial, and other applications for this type of apparatus can be cited its service as an extended range aerial platform for television camera, radio antenna, radar scanning equipment, flares, floodlights, public address systems, fire fighting equipment, and the like, as well as its use at sea for mounting sonar gear or towing of mine-sweeping or detecting equipment, and service as a flying crane for transportation of personnel or supplies across rivers, ravines, etc.

Another object of the invention is the provision of a tethered aircraft capable of maintaining a desired position and attitude in the air notwithstanding opposing wind and gust forces.

Another object of the invention is the provision of a captive helicopter which can be remotely controlled as to horizontal position as well as vertical position, and under all flight conditions.

Still another object of the invention is the provision of a tethering means to maintain such aircraft captive without interfering with its stability or desired performance.

A further objective is the provision of handling and control means at a remote stationary or mobile location for the efficient and, in large degree, automatic handling, launching, operating, control, and recovery of such a captive aircraft.

The foregoing and other objects as well as the many advantages and uses of this invention will become apparent from the following description, referring to the accompanying drawings, in which:

Figure 1 comprises a combined diagrammatic, perspective, and elevational representation of a system for the captive flight and control of a pilotless helicopter, showing in proper relationship, with interconnecting means, the helicopter in flight, the tethering and power cables, the ground pattern apparatus, a launching and landing rig, and the remotely situated control station and apparatus, all in accord with the present invention;

Figure 2 is an enlarged partial elevational view of the helicopter of Figure 1 showing details of the tethering cable attachment structure, motor mounting and power connections, and speed reduction and belt drive means; and Figure 3 is a perspective view, partially diagrammatic, of a modification of the ground pattern apparatus of Figure 1.

As shown in Figure 1, the system contemplated by this invention comprises a pilotless helicopter 20, ground pattern apparatus 21, and control station apparatus 22, with interconnecting cables. Assembled to the vertical member 23 of helicopter 20 is bridle 24, having three arms 25, 26, and 27, extending upwardly and outwardly from the bottom of vertical member 23, to provide at their upper extremities tethering cable attachment point fittings 28, 29, and 30, for the three tethering cables 31, 32, and 33, respectively, of the system. Suitably positioned supports 34, 35, and 36, provide necessary bracing of arms 25, 26, and 27, for structural integrity, and together with such arms supply the means for proper working of the pull forces applied at the tethering points. The bridle thus comprises an inverted triangular pyramid construction offering the advantages of simplicity and light weight while at the same time providing a form of structure suitable for the general requirements of the craft and adaptable for cooperation with the launching and landing rig 84, as more fully described hereinafter.

The ground pattern apparatus 21 includes three elongated tracks or runways 40, 41, and 42, arranged in star position in the ground plane, as shown in Figure 1, and being of equal selected length dependent upon the altitude capability of the helicopter in a particular system. The primary function of this ground pattern apparatus is to maintain optimum controllability and stability of the helicopter for all operational altitudes, and the apparatus achieves this function through maintenance of tethering cable angles within limits such as will insure continuance of effective moment arms and force couples. Tracks 40, 41, and 42 have associated with them, respectively, vertically disposed movable pulleys 43, 44, and 45, respectively mounted upon runners or skates 46, 47, and 48, which are free to run along their respective tracks 40, 41, 42. Tethering cables 31, 32, and 33 are thereaded through pulleys 43, 44, and 45, respectively, thence through respectively adjacent horizontally disposed pulleys 55, 56, and 57, which are fixed in position toward the inward ends of their respective tracks, and thence to control station apparatus 22. It will be noted that the upward pull forces on the tethering cables will always have some inwardly directed horizontal component, no matter what the helicopter altitude, with consequent tendency of movable pulleys 43, 44, and 45 to be drawn inward thereby. It will also be noted that as the helicopter altitude increases, the angle of the tethering cables becomes more and more vertical with resulting disadvantageous change in moment arm and force couple combinations at the helicopter bridle. To offset this undesirable change, auxiliary lines 58, 59, and 60 are respectively fastened to skates 46, 47, and 48, lines 59 and 60 being threaded through small pulleys 61 and 62 fixed at the outer ends of tracks 41 and 42, respectively, thence through companion pulleys 63 and 64, located at the inner ends of tracks 41 and 42, respectively, and thence to control station apparatus 22. Due to orientation of track 40 with respect to the control station location, line 58 can be extended directly from skate 46 to apparatus 22 without intervention of pulleys. Outward movement of pulleys 43, 44, and 45 can thus be accomplished by drawing in of lines 58, 59, and 60 at the control station, which lines, for convenience and uniformity of operation may, if desired, be joined together into a single line 90 through the medium of joiner plate 91 as shown, and thence applied to rotatable drum 92 which may be power driven and braked by conventional means, not shown. Desired angularity of tethering cables as helicopter altitude increases is thereby maintained, and inward movement of such pulleys, as helicopter altitude decreases, can be accomplished simply by release of such lines at the control station, thereby avoiding too great angularity of tethering lines and similar loss of control as the helicopter approaches a landing at the center of the tracks.

Control station apparatus 22 comprises a conventional type electric generator driven by a gasoline engine, not shown, supplying power to the electric motor drive for the helicopter 20, and conventional means, not shown, for the control thereof with consequent control of motor speed, rotor thrust, and helicopter altitude, a power driven tethering cable drum 93 or drums and conventional means, not shown, for control and braking thereof, a similar skate position line drum 92 and control as already noted, and a helicopter control stick 70 and pulley system as diagrammed in Figure 1. To avoid sudden application of full power to the helicopter rotors 80 and 81, motors 82 and 83 are engaged electrically by switch while the engine and generator are running at idling speed. Gradual opening of engine throttle then results in gradual increase in motor speed as voltage picks up with consequent gradual increase in rotor speed. Control stick 70 is comparable to a conventional helicopter cyclic pitch control stick and has the same function, although its effect is to selectively tip the rotor shaft rather than to change blade pitch. Through teetering hinges 100 and 101 this creates the same effect as cyclic pitch change and results in tipping the disks of the rotors. Control stick 70 has extending outwardly from its lower end three legs 71, 72, 73, arranged in star position, each of such legs having associated with it a group of three pulleys and one of the three tethering cables. Thus leg 71 has associated with it pulleys 71a, 71b, and 71c, and cable 31 threaded therethrough as shown, leg 72 has associated with it pulleys 72a, 72b, and 72c, and cable 32 threaded therethrough as shown, and leg 73 has associated with it pulleys 73a, 73b, and 73c, and cable 33 threaded therethrough as shown, all cables thereafter being applied about drum 93. Operation of control stick 70 and effect thereof will be evident from examination of the diagram. Illustratively, with cable drum 93 brake set so that no additional cable can pay out, movement of stick 70 to the right as indicated by the arrow will result in a drawing up of cable 32 at the stick with consequent increase of downward pull at tethering point 29, and comparable downward movement of cable 31 at the stick with consequent decrease of downward pull at tethering point 28, which results in a tipping of the rotor disk to the right and a consequent movement of the helicopter in that direction. Return of the control stick to vertical position will equalize the forces at the tethering points again and the helicopter will resume hovering attitude in the new position, wind and gust forces permitting. Position of the helicopter relative to the ground can be similarly maintained against the forces of the wind by keeping the rotor disk tipped oppositely thereto in equilibrium therewith. Illustratively of the important feature of this system providing substantially automatic compensation for gust conditions, if the control stick is locked in a given position changes in wind velocity will change the drag on the helicopter, thereby increasing or decreasing the upwind or downwind tethering cable tension as the case may be. This results in automatically increasing or decreasing the tilt of the rotor disks, thus adjustably maintaining equilibrium with the varying wind forces. This locked control stick method of compensation for wind will allow the helicopter to move off position. Manual operation of the control stick will hold the helicopter on position, and this combined with the locked stick method will enable compensation for a greater wind variation.

Helicopter 20, as shown in Figure 1, utilizes two contra-rotating co-axial rotors 80 and 81, each with two blades, such blades being articulated about their flapping axes only, through teetering hinges 100 and 101. The power plant comprises a three phase four hundred cycle electric motor 82 and 83 for each rotor, the rotors being nonsynchronous, except that their respective motors are synchronized through the four hundred cycle driving generator at the control station. In the preferred embodiment of the invention, three separately insulated electrical conductors are combined in twisted relationship to make up the structure of each of the three tethering cables 31, 32, and 33, so that each such cable serves the dual function of tethering and power transmission, with one-third of each of the three phases of electrical energy and consequently one-third of the total power being thus transmitted through each such tethering cable, although of course a power cable arrangement additional to and separate from the tethering cable structure could be used if desired.

As shown in detail in Figure 2, sleeve 120 is affixed about helicopter vertical member 23 to increase its structural strength in a relatively highly stressed portion thereof. Vertical member 23 serves also as the upper rotor shaft. Lower rotor shaft 121 is coaxially assembled about vertical member 23 and sleeve 120 by means of bearing assembly pair 122 and 123 so as to be free to rotate relative thereto. Motor mount 124 is in turn assembled about lower rotor shaft 121 by means of bearing assembly pair 125 and 126 so as to be free to rotate relative to both lower and upper rotor shafts, and the motors 82 and 83 are fixedly attached to motor mount 124 (only motor 83 being shown in Figure 2). Bridle 24 is assembled to the bottom of vertical member 23 through bearing assembly 127, and to the motor mount 124 through bearing assembly 128. The foregoing assembly thus permits the two rotor shafts, the motor mount, and the bridle structure all to rotate about the common rotational axis of the helicopter independently of each other. Independent mounting of the bridle avoids twisting of tethering cables in the event of any unbalance in torque which might be caused by rotor variations. The power cables extend from the bridle attachment point fittings through respective supports 34, 35, and 36 to slip rings 129, with brushes 130 maintaining the power connection therefrom to the motors. A 30 to 1 speed reduction, and belt drive transmission, is provided through upper and lower rotor shaft pulleys 102 and 103, rotor shaft pulleys 104 and 105, intermediate pulley pairs 106 and 107 and 108 and 109, and interconnecting belts as shown in Figure 1 and partially in Figure 2. Teeth are provided on the pulleys to prevent belt slippage.

The launching and landing rig 84, shown in Figure 1, is essentially a landing gear for the helicopter which stays on the ground, with the advantage of decreasing weight and increasing payload or ceiling for the airborne device, such arrangement being made possible by the built-in stability of the system and the capability of the helicopter to be returned to the same point from which it took off. Rig 84 is a funnel type spring-loaded structure dimensioned so as to permit bridle 24 to rest in ring 85 without touching the ground when the helicopter is at rest. Spring structure vertical members 86 provide shock absorption as the helicopter is drawn into the rig. A microswitch (not shown) operated by the helicopter as it becomes positioned in the rig on landing automatically cuts off power at the control station to avoid results of possible inadvertence on the part of the operator. Positioning of the rig centrally of pulleys 43, 44, and 45 in the ground pattern apparatus 21 will be seen to permit desired manipulation of the helicopter with respect thereto from the remotely located control station as heretofore described. Adaptability of this rig for use in other applications, such as in operational activities at sea and involving noncaptive aircraft of various types controllable as to landing position, is also contemplated.

Modification of the ground pattern apparatus 21 to provide means alternative to the movable pulleys 43, 44, and 45 for controlling tethering cable angles is illustrated in Figure 3. In this modified ground pattern apparatus 21a pulleys 43a, 44a, and 45a are fixed at the outer ends of runners 40a, 41a, and 42a, with tethering cables 31, 32, and 33 being threaded therethrough. Floating pulleys 31a, 32a, and 33a ride on cables 31, 32, and 33, respectively, as shown, and may be drawn in or let out to alter cable angle from the control station by means of auxiliary lines 58a, 59a, and 60a, attached to such pulleys, respectively, threaded through pulleys 63a, 64a, and 65, fixed centrally of the ground pattern apparatus 21, and extended therefrom to the control station location.

It will be seen that this invention provides a simplified pilotless helicopter and a complete system for remotely controlled captive flight thereof. While one embodiment of the invention, and certain refinements and modifications thereof, have been described and illustrated in detail, it will of course be understood that the invention is not limited to the specific forms and arrangements so shown and described. Many modifications, variations, combinations, adaptations, and uses thereof will occur, and all such modifications, etc., are equally within the contemplation and scope of the invention and the appended claims.

Having thus described our invention, we claim:

1. A helicopter adapted for captive flight and remote control having a pair of coaxial contra-rotating rotors mounted to rotate about a common vertical axis, a bridle structure assembled about said vertical axis and providing a plurality of tethering cable attachment points, an electric motor for each rotor and a bearing mount assembling said motor to the bridle structure so that said motor is free to rotate about said vertical axis with respect to said bridle structure, and a speed reducing transmission connecting each motor to its rotor and comprising a motor shaft pulley, a rotor shaft pulley, an intermediate pair of pulleys, and interconnecting belts.

2. A helicopter and a system for the captive flight and remote control thereof having ground pattern apparatus including a plurality of elongated tracks arranged radially in the ground plane, each track having a skate assembled thereto so as to be free to move lengthwise thereof and each skate having a vertically disposed rotatable pulley mounted thereon, a horizontally disposed companion pulley for each skate pulley affixed inwardly of its respective track, control station apparatus situated remotely from said ground pattern apparatus, and a tethering cable for each track extending from the helicopter through the skate pulley and its companion pulley to said control station apparatus.

3. The helicopter and system of claim 2 having an additional pulley affixed at the outer end of a track and an additional pulley affixed at the inner end thereof, and an auxiliary cable attached to the skate and extending therefrom through said outer end pulley, thence through said additional inner end pulley, and thence to said control station apparatus.

4. A helicopter and a system for the captive flight and remote control thereof having ground pattern apparatus including a plurality of elongated tracks arranged radially in the ground plane, each track having a pulley affixed to its outer end, control station apparatus situated remotely from said ground pattern apparatus, and a tethering cable for each track extending from the helicopter through said outer end pulley to said control station apparatus.

5. The helicopter and system of claim 4 having a floating pulley riding on each tethering cable between the helicopter and the outer end track pulley, an additional pulley companion affixed at the inner end of the track and an auxiliary cable attached to said floating pulley and extending through said pulley companion and thence to said control station apparatus.

6. In a three point tethering system for the captive flight and remote control of a pilotless rotary-wing aircraft, said aircraft having structurally integrated therewith three tethering cable attachment point fittings in selectively spaced relationship with each other, and a tethering cable attached to each of said fittings, ground pattern apparatus including three elongated tracks positioned starwise in the ground plane in correspondence with the positioning of the aircraft attachment point fittings, each track having a skate assembled thereto so as to be free to move lengthwise thereof and each skate having a vertically disposed rotatable pulley mounted thereon, a horizontally disposed companion pulley for each skate pulley affixed inwardly of its respective track, control station apparatus situated remotely from said ground pattern apparatus, each of said tethering cables extending from the helicopter through a respective skate pulley and its companion pulley and thence to said control station apparatus, said control station apparatus including power driven winding drum means and said tethering cables being wound thereabout, an intermediately positioned vertically disposed control stick having three horizontally disposed legs extending outwardly from its lower end starwise in correspondence with the positioning of the elongated tracks and the aircraft attachment point fittings, a pulley affixed to the outer end of each leg, a fixed pair of pulleys associated with each said leg pulley, each tethering cable extending from the ground pattern apparatus being threaded through one of a respective fixed pair of pulleys, thence through the associated leg pulley, thence through the other of the fixed pair of pulleys and then to said winding drum means.

7. In the system of claim 6 the ground pattern apparatus being so oriented that the control station apparatus is generally situated about the extended lengthwise axis of one of the tracks, an auxiliary cable attached to the skate on said track and extending therefrom to said control station apparatus, an additional pulley affixed at the outer end of each of the other two tracks and an additional pulley companion to each fixed at the inner end of each of said other two tracks, and an auxiliary cable attached to each of the other two skates and extending through its respective outer end fixed pulley and pulley companion to said control station apparatus which includes winding drum means about which all of said auxiliary cables are wound.

8. In the system of claim 7 a triangular shaped joiner plate to the base of which said three auxiliary cables are fastened and additional single cable fastened to the apex thereof, extending to and being wound about said winding drum means.

9. In a multiple line tethering system for the captive flight and remote control of a pilotless aircraft, control station apparatus including a control stick pivoted at one end so as to be movable in any direction thereabout, a plurality of legs equal in number to the number of tethering lines in the system affixed to said control stick pivoted end and extending outwardly starwise therefrom in a plane generally normal of the control stick plane, a rotatable pulley affixed to the outer end of each leg, a separate pair of pulleys associated with each said leg pulley and positionally fixed with respect to said control stick end, and a separate tethering cable threaded through one of each said pair of pulleys, thence through the associated leg pulley and thence through the other of said pair of pulleys.

10. A helicopter adapted for captive flight and remote control having an upper rotor shaft with an upper rotor attached thereto, a lower rotor shaft with a lower rotor attached thereto, bearing assembly means coaxially assembling said lower rotor shaft to said upper rotor shaft, a motor mount, bearing assembly means coaxially assembling said motor mount to said lower rotor shaft, a separate electric motor for each rotor shaft affixed to said motor mount, a bridle comprising an inverted pyramid shaped structure substantially enclosing said motor mount and having a plurality of upwardly and outwardly extending arms and supports therefor, each arm bearing a tethering cable attachment point fitting so arranged that all said attachment points lie in a common horizontal plane closely underlying said lower rotor, bearing assembly means coaxially assembling said bridle to said upper rotor shaft and to said motor mount, slip rings affixed to said bridle, brushes affixed to said motor mount to provide sliding electrical contact with said slip rings and being electrically connected to said motors, and electric power cables extending from said tethering cable attachment point fittings through said arm supports and connected to said slip rings.

References Cited in the file of this patent

UNITED STATES PATENTS

| | | |
|---|---|---|
| 954,574 | Koegler | Apr. 12, 1910 |
| 1,389,925 | Zurovec | Sept. 6, 1921 |
| 2,058,161 | Lewis | Oct. 20, 1936 |
| 2,390,307 | Kelecius | Dec. 4, 1945 |
| 2,415,071 | Brie | Feb. 7, 1947 |
| 2,508,683 | Nelson | May 23, 1950 |
| 2,681,190 | Thomson | June 15, 1954 |
| 2,739,416 | Sterling | Mar. 27, 1956 |

FOREIGN PATENTS

| | | |
|---|---|---|
| 864,986 | France | Feb. 10, 1941 |